United States Patent [19]

Baghdachi et al.

[11] Patent Number: 4,894,426

[45] Date of Patent: Jan. 16, 1990

[54] FAST-CURE POLYURETHANE SEALANT COMPOSITION CONTAINING SILYL-SUBSTITUTED PIPERAZINE ACCELERATORS

[75] Inventors: Jamil Baghdachi, Northville; Keith H. Mahoney, Grosse Pointe City, both of Mich.

[73] Assignee: BASF Corporation, Clifton, N.J.

[21] Appl. No.: 234,221

[22] Filed: Aug. 19, 1988

[51] Int. Cl.$^4$ .............................................. C08G 77/06
[52] U.S. Cl. ...................................... 528/22; 528/33; 528/34; 528/901; 525/453
[58] Field of Search .................. 528/28, 22, 33, 34, 528/901; 525/453; 544/229, 402

[56] References Cited

U.S. PATENT DOCUMENTS

| | | | |
|---|---|---|---|
| 3,632,557 | 1/1972 | Brode | 260/77.5 |
| 3,673,233 | 6/1972 | Golitz et al. | 528/26 |
| 3,779,794 | 12/1973 | De Santis | 117/72 |
| 3,979,344 | 9/1976 | Bryant et al. | 260/18 |
| 4,038,239 | 7/1977 | Coyner et al. | 260/77.5 |
| 4,469,831 | 9/1984 | Bueltjer et al. | 524/112 |
| 4,578,417 | 3/1986 | Furukawa et al. | 524/378 |
| 4,672,003 | 6/1987 | Letoffe | 428/447 |
| 4,707,515 | 11/1987 | Gilch et al. | 524/506 |

*Primary Examiner*—John C. Bleutge
*Assistant Examiner*—R. Dean, Jr.
*Attorney, Agent, or Firm*—Jerry F. Janssen

[57] ABSTRACT

One-component, moisture-curable sealant compositions having fast cure times comprise a mixture of a silane-capped polyurethane polymer, an aminosilane cross-linking agent, and a silyl-substituted piperazinyl accelerator.

11 Claims, No Drawings

FAST-CURE POLYURETHANE SEALANT COMPOSITION CONTAINING SILYL-SUBSTITUTED PIPERAZINE ACCELERATORS

FIELD OF THE INVENTION

This invention relates to room temperature moisture-curable polymer sealant compositions. More particularly, this invention concerns one-part room temperature curable polyurethane sealant compositions containing silyl-substituted piperazinyl accelerating agents having improved cure rates.

BACKGROUND OF THE INVENTION

Sealants are comprised of pigmented or unpigmented synthetic elastomeric polymers which, in the uncured state, constitute pourable or easily extrudable putty-like mastics. When cured, the sealants are transformed into elastomeric materials which have viscoelastic properties and can react to the relative motion of the structural elements which the sealant connects and seals. They also form a tight barrier against moisture, gases and chemicals. Such sealants find a wide variety of applications in the building trades industry and the automotive industry. In the latter case they are widely used to seal fixed window panels and taillight glass panels to coated auto, truck, and bus bodies.

Such sealants include compositions based on polysiloxane polymers as well as others which include polyurethane or polyacrylate polymers. Additionally, modern sealant compositions include one-part and two-part formulations which cure by a variety of chemical mechanisms. One-part sealant compositions generally contain an end-capped base polymer together with a reactive cross-linking agent and, typically, a curing catalyst which promotes the cross-linking reaction either when heated or exposed to atmospheric moisture. Upon application under normal conditions of temperature and moisture, one-part sealants react to form tough, pliable elastomeric seals.

Two-part sealant compositions, on the other hand, comprise two reactive components which are separately packaged and mixed just prior to or at the time of application and react upon mixing to form the semi-rigid sealant bead.

Two-part sealant compositions are less convenient to use since it is necessary to accurately premeasure and mix the components prior to use or accurately meter the components during application to insure correct proportions if the two components are applied together to form the sealant bead. For this reason, one-part sealants have found wider acceptance in the market. A number of such one-part moisture-curable sealant compositions are known. Because of their convenience and ease of use, there has been increasing demand for such sealants, especially if they possess both good shelf life and rapid curing rates.

To enhance the curing rates of moisture-cured sealants, a variety of curing catalysts and accelerators have been incorporated into such one-part compositions. The following United States patents disclose one-part moisture-curable polyurethane based sealant compositions and curing catalysts: U.S. Pat. No. 3,779,794 to De Santis (1,2,4-trimethylpiperazine); U.S. Pat. No. 3,979,344 to Bryant (dibutyl tin diacetate); U.S. Pat. No. 4,038,239 to Coyner, et al. (metallic salts of tin, lead, mercury, or Group VIII such as iron, organo-tin (IV) and organo-lead compounds, and organic amines such as trialkylamines, N-substituted piperidines, N,N'-substituted piperazines, pyridine); U.S. Pat. No. 4,469,831 to Bueltjer, et al. (aliphatic or aromatic carboxylic acids, toluenesulfonic acid); U.S. Pat. No. 4,672,003 to Letoffe (silane- or siloxane-substituted morpholines; and U.S. Pat. No. 4,707,515 to Gilch, et al. (organic and inorganic acids, salts of organic acids such as tin naphthenate, tin octoate, tin butyrate, dibutyltin dioctoate, dibutyltin dilaurate, dibutyltin diacetate, iron stearate, lead octoate, or organic amines).

SUMMARY OF THE INVENTION

It has been found, in accordance with the present invention, that one-component polyurethane-based sealant compositions having fast cure rates at room temperature in the presence of moisture comprise a mixture of a silane-terminated polyurethane polymer, from about 0.2 to about 1.0 parts by weight of an aminosilane per 100 parts by weight of the polyurethane polymer, and from about 0.2 to about 1.0 parts by weight of a silyl-substituted piperazinyl accelerator per 100 parts of the polyurethane polymer.

The silane-capped polyurethane polymer has the structure

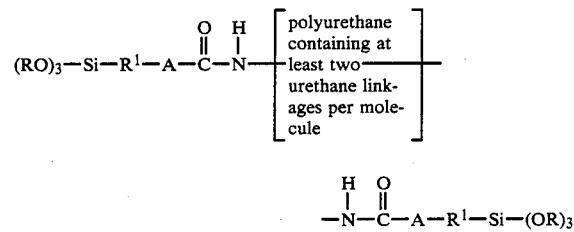

where R is lower alkyl of from 1 to 6 carbon atoms and $R^1$ is a divalent bridging radical selected from the group consisting of divalent hydrocarbon radicals, divalent hydrocarbon ether radicals, and divalent hydrocarbon amino radicals. The group A is selected from —S— and —$NR^2$— where $R^2$ is hydrogen or alkyl of from one to six carbon atoms.

The aminosilane has the structure

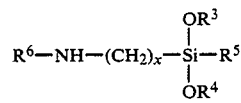

where x is an integer of from one to three, and $R^3$ and $R^4$ may be the same or different and are selected from alkyl of from one to four carbon atoms. The group $R^5$ is alkyl of from one to four carbon atoms or alkoxyl of from one to four carbon atoms and $R^6$ is hydrogen or —$(CH_2)_yNHR^7$ where $R^7$ is hydrogen or —$(CH_2)_zNH_2$. The subscripts y and z may be the same or different and are integers of from one to three.

The silyl-substituted piperazinyl accelerator is selected from the group consisting of mono- di- or trisilyl-substituted piperazine compounds having the structure

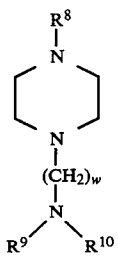

where w is an integer of from one to five, $R^8$, is hydrogen or

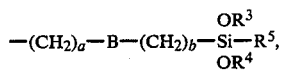

where a is an integer of from one to four, b is zero or an integer of from one to four, B is a direct bond or is a divalent hydrocarbaryl radical or a divalent cyclohydrocarbyl radical, and $R^9$ and $R^{10}$ are independently hydrogen, alkyl of from one to five carbon atoms, or

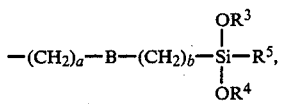

where a, b, B, $R^3$, $R^4$, and $R^5$, are as defined above, with the proviso that at least one of $R^8$, $R^9$ and $R^{10}$ must be

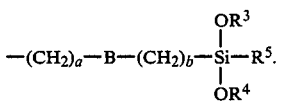

The composition may also contain other ingredients generally known to formulators of polymeric sealant compositions such as pigments, thixotropic agents, fillers, acidic or basic polymerization agents, and the like.

DETAILED DESCRIPTION OF THE INVENTION

As used throughout this specification and the appended claims, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule. The term "divalent hydrocarbyl" means a branched or unbranched hydrocarbon group derived by removal of two hydrogen atoms from a saturated or unsaturated acyclic hydrocarbon. The term "divalent hydrocarbaryl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from carbocyclic non-aromatic hydrocarbon ring including cyclohexane, alkylcyclohexane, and the like.

The sealant compositions of the present invention comprise a base silane-capped polyurethane polymer having a number average molecular weight in the range of from about 10,000 to about 30,000 having the structure

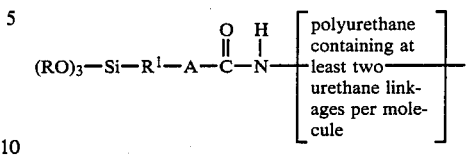

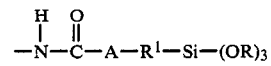

where R, $R^1$, and A are defined above. Such silane-capped polyurethane polymers are prepared by conventional polymerization techniques by reacting a polyether polyol having at least two free hydroxyl groups per molecule with an isocyanate compound having at least two isocyanate reactive groups per molecule. The polyether polyol and isocyanate compound are reacted in a weight ratio of about 8:1 to about 12:1, respectively. The starting polyether polyol preferably has a number average molecular weight of between about 1,000 and 5,000. One such preferred starting material is polypropylene glycol available as Polypropylene Glycol 2025 from Union Carbide Co., 270 Park Avenue, New York, N.Y. 10017.

The starting isocyanate compound may be selected from a variety of materials known in the art for such purposes, but one such preferred material is toluene diisocycanate.

The copolymer formed by reaction of these two monomers is end-capped with a silane group having the structure —A—$R^1$—Si—(OR)$_3$. The group A is sulfur or an alkylamino group in which the alkyl portion contains from one to six carbon atoms. The bridging group $R^1$ may be a divalent hydrocarbon radical, a divalent hydrocarbon radical containing one or more oxygen ether linkages, or a divalent hydrocarbon radical containing one or more >NH linkages. The end-capping of the polyurethane polymer is achieved by including in the reaction mixture containing the polyether polyol and isocyanate compound an aminosilane compound such as gamma-aminopropyl trimethoxysilane (A 1110) availiable from Union Carbide Corp., 270 Park Ave., New York, N.Y. 10017.

The silane-capped polyurethane polymer is mixed with from about 20 to about 50 parts by weight of a pigmenting agent and/or filler such as carbon black per 100 parts by weight of the capped polyurethane polymer. Small amounts, ranging from about 0.25 to about 0.75 parts by weight of a thixotropic agent per 100 parts by weight of polyurethane polymer may also be added to adjust the flow characteristics of the sealant composition. A typical thixotropic agent suitable for this purpose is Thixseal 1085 available from NL Chemicals, Inc., Heightstown, N.J. 08520.

Additional aminosilane is added to the sealant composition in amounts ranging between about 0.2 to about 1.0 parts by weight (preferably between about 0.4 to about 0.8 parts by weight) per 100 parts by weight of the polyurethane polymer. The aminosilane used is selected from compounds having the formula

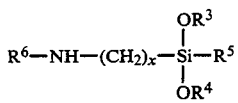

where x is an integer of from one to three and $R^3$ and $R^4$ may be the same or different and are selected from alkyl of from one to four carbon atoms. The group $R^5$ is alkyl of from one to four carbon atoms or alkoxyl of from one to four carbon atoms and $R^6$ is hydrogen or $-(CH_2)_yNHR^7$. $R^7$ is hydrogen or wherein y and z may be the same or different and are integers of from one to three. Suitable materials for this purpose are aminosilanes such as A 1110, A 1120, and A 1130, available from Union Carbide Corp. 270 Park Ave., New York, N.Y. 10017.

The sealant compositions of this invention further contain from about 0.2 to about 1.0 parts by weight (preferably between about 0.2 to about 0.8 parts by weight) per 100 parts by weight of the polyurethane polymer of a silyl-substituted piperazinyl accelerator selected from compounds having the structure

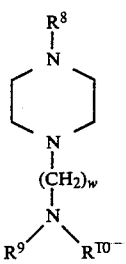

where w is an integer of from one to five, $R^8$, is hydrogen or

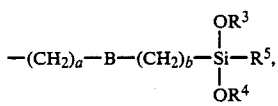

where a is an integer of from one to four, b is zero or an integer of from one to four, B is a direct bond or is a divalent hydrocarbaryl radical or a divalent cyclohydrocarbyl radical, and $R^9$ and $R^{10}$ are independently hydrogen, alkyl of from one to five carbon atoms, or

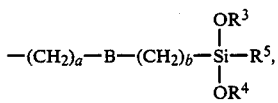

where a, b, B, $R^3$, $R^4$, and $R^5$, are as defined above, with the proviso that at least one of $R^9$ and $R^{10}$ must be

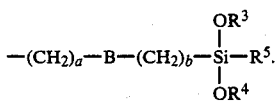

Preferred substituted piperazine compounds include those in which one ring nitrogen atom of piperazine is substituted by a silyl group and the other ring nitrogen atom is substituted by (a) aminoalkyl of from one to five carbon atoms, (b) alkylaminoalkyl of from two to ten carbon atoms, or (c) dialkylaminoalkyl of from three to fifteen carbon atoms, for example, aminomethyl, methylaminomethyl, dimethylamino- methyl, 1- and 2-aminoethyl, 2-(methylamino)ethyl, 2-(dimethylamino)ethyl, 2-(ethylamino)ethyl, 2-(diethylamino)ethyl, 1-, 2- or 3-aminopropyl, 3-(methylamino)propyl, and 3-(dimethylamino)-propyl, and the like.

Silyl-substituted piperazinyl compounds of the type suitable for use in sealant compositions of the present invention are made by reacting the appropriate chlorosilane with the desired substituted piperazine compound in an aprotic inert polar organic solvent such as 1,1,1-trichloroethane at a temperature between about 50° C. and 100° C., preferably at about 80° C. The reaction is carried out for a period sufficient to effect substantially complete reaction between the two starting materials, typically for about two to six hours.

The starting chlorosilane compounds are commercially available from Dynamit Nobel Chemicals, Silanes & Silicones Group, Bartram Road, Bristol, Pa. 19007, U.S.A. The starting aminoalkyl-substituted piperazines are commercially available from such sources as Aldrich Chemical Co., 940 West St. Paul Ave., Milwaukee, Wisc., 53233 U.S.A. or are easily synthesized by conventional methods known to practitioners of the organic chemical arts.

A mixture of products is obtained from the reaction between the chlorosilane and starting piperazine compound since there are one, two, or three reactive sites for the chlorosilane, depending upon whether the starting piperazine compound is a dialkylaminoalkyl-, alkyl aminoalkyl-, or aminoalkylpiperazine compound, respectively. This process is typified by the following Reaction Scheme where, for the sake of example, the reaction between 1-(2-aminoethyl)piperazine and 1-chloro-3-(trimethoxysilyl)propane is shown.

While not adhering to any particular theory to the exclusion of others, it is believed that the function of the silyl-substituted piperizinyl compound is at least threefold: first, the silyl-substituted piperazinyl compound is thought to be instrumental in accelerating the curing rate of the polymeric composition; second, it is believed to promote the adherence of the resulting elastomer; and third, the amine functionality present in the substituted piperazinyl compounds is believed to act as an acid scavenger in the composition, promoting its shelf-life.

It has been found in accordance with the present invention that the inclusion of such substituted piperazinyl accelerators in the sealant compositions significantly increases the cure rates over the cure rates for similar sealant compositions which lack such accelerator compounds, as can be seen from the data provided in the following Table. Enhanced cure rates provide an important advantage when the sealants of this invention are employed, for example, in sealing fixed window panels and taillight glass panels to motor vehicle bodies where slowly curing sealants may present problems in a continuous production assembly line operation.

TESTING PROCEDURES

The lap shear strength of several materials prepared in accordance with the teachings of the present invention were tested according to the following method. In each instance, pairs of shear strength test plates were prepared by bonding two previously primed and painted steel plates, each 1 inch by 0.32 inches (2.54 cm×0.81 cm), with a sealant bead 1 inch long by 0.25 inches wide by 5/16 inches thick (2.54 cm×0.64 cm×0.79 cm). The sealant bead was applied along one of the one-inch edges of the test plates by means of a sealant tube. The plates were then pressed together so that the sealant bead was about 0.25 inches (0.64 cm) thick.

Reaction Scheme

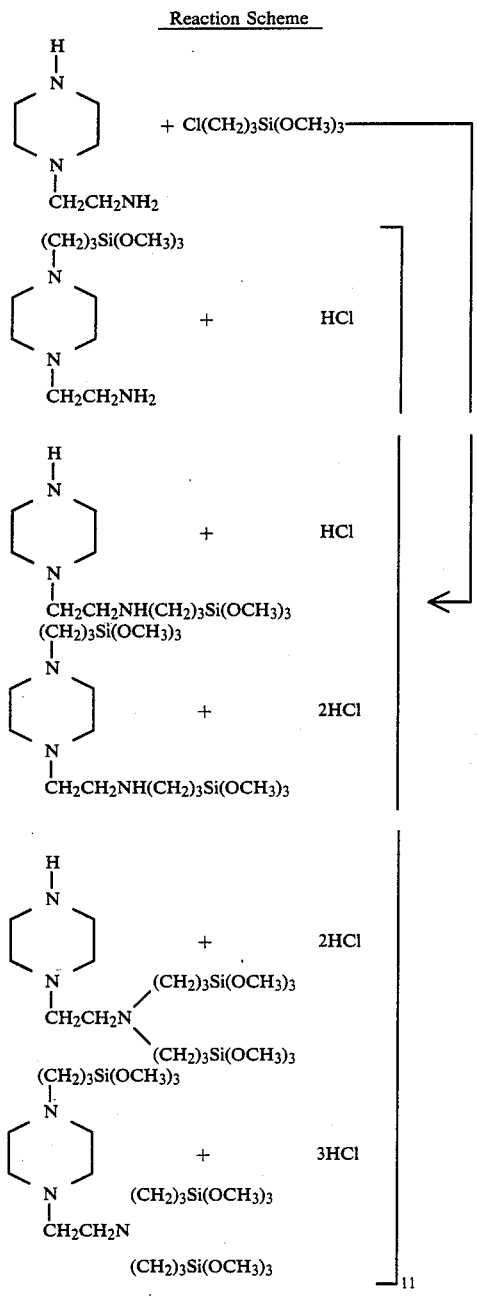

The sealant bead applied to the bonded test plates was allowed to cure at room temperature and 50% relative humidity for periods which varied between three hours and seven days. After the appropriate cure time in each case, the shear strength of each sealant bead was tested on an Instron testing machine by pulling in a direction parallel to the faces of the bonded test plates. The results of these tests, along with other properties of the tested compositions, appear in the following Table.

TABLE

| | Shear Strength and Properties of Sealant Composition of The Present Invention | |
|---|---|---|
| Example | Property | Value |
| 5 | Lap Shear Strength After 3 Hours | 95 psi (655 kP) |
| | Lap Shear Strength After 24 Hours | 490 psi (3378 kP) |
| | Lap Shear Strength After 48 Hours | 685 psi (4773 kP) |
| | Lap Shear Strength After 7 Days | 975 psi (6722 kP) |
| | Tensile Strength (ASTM D1002) | 1000 psi (6895 kP) |
| | Elongation | 200% |
| | Hardness (Shore A Durometer, ASTM D2240) | 55 |
| 6 | Lap Shear Strength After 3 Hours | 90 psi (621 kP) |
| | Lap Shear Strength After 24 Hours | 430 psi (2965 kP) |
| | Lap Shear Strength After 48 Hours | 700 psi (4826 kP) |
| | Lap Shear Strength After 7 Days | 1010 psi (6964 kP) |
| | Tensile Strength (ASTM D1002) | 930 psi (6412 kP) |
| | Elongation | 250% |
| | Hardness (Shore A Durometer, ASTM D2240) | 55 |
| 7 | Lap Shear Strength After 3 Hours | 60 psi (414 kP) |
| | Lap Shear Strength After 24 Hours | 405 psi (2792 kP) |
| | Lap Shear Strength After 48 Hours | 610 psi (4206 kP) |
| | Lap Shear Strength After 7 Days | 800 psi (5516 kP) |
| | Tensile Strength (ASTM D1002) | 860 psi (5929 kP) |
| | Elongation | 350% |
| | Hardness (Shore A Durometer, ASTM D2240) | 52 |
| 8 | Lap Shear Strength After 3 Hours | 90 psi (620 kP) |
| | Lap Shear Strength After 24 Hours | 485 psi (3344 kP) |
| | Lap Shear Strength After 48 Hours | 715 psi (4930 kP) |
| | Lap Shear Strength After 7 Days | 888 psi (6123 kP) |
| | Tensile Strength (ASTM D1002) | 1050 psi (7240 kp) |
| | Elongation | 300% |
| | Hardness (Shore A Durometer, ASTM D2240) | 50 |
| 9 | Lap Shear Strength After 3 Hours | 125 psi (862 kP) |
| | Lap Shear Strength After 24 Hours | 508 psi (3503 kP) |
| | Lap Shear Strength After 48 Hours | 694 psi (4785 kP) |
| | Lap Shear Strength After 7 Days | 1050 psi (7240 kP) |
| 10 | Lap Shear Strength After 3 Hours | 11 psi (76 kP) |
| | Lap Shear Strength After 24 Hours | 348 psi (2399 kP) |
| | Lap Shear Strength After 48 Hours | 490 psi (3378 kP) |
| | Lap Shear Strength After 7 Days | 707 psi (4875 kP) |

As can be seen by comparison of the data for Examples 5 and 10, the sealant compositions have a much faster cure rate when the accelerators of the present invention are a component of the composition. Example 5 contained a preferred accelerator of the invention, while in Example 10 the composition was identical, except that the accelerator was missing. After three hours of curing, the lap shear strength of the material of Example 5 was almost nine times as great as that of Example 9.

Moreover, the data in the Table indicate that increasing the amount of accelerator has a positive effect on the cure rate as shone by comparing the three-hour lap shear strength of the compositions of Examples 5, 8 and 9. The three-hour lap shear strength increased as the amount of accelerator was increased in each instance. In Examples 8 and 9, the aminosilane was omitted to test the resulting effect, and the data indicate that there was little effect of the omission on the enhancement of the cure rate. (The presence of the aminosilane is preferred, however, to enhance other desirable properties of the final sealant composition such as adhesion.)

The following examples are provided to enable one skilled in the art to practice the present invention. These examples are merely illustrative of the present invention and are not to read as limiting the scope of the invention which is defined by the appended claims.

Preparation of Starting Materials

EXAMPLE 1

Preparation of Base Polyurethane Polymer

A silane-capped polyurethane polymer of the type described in U.S. Pat. No. 3,632,557 was prepared as follows:

| | | |
|---|---|---|
| A. | Niax PPG 2025 ONE | 2001.00 g |
| | (2000 Molecular weight polyether | |
| | polyol availabe from Union Carbide | |
| | Corp., 270 Park Ave., New York, NY | |
| | 10017) | |
| | Hylene TM | 204.00 g |
| | (80:20 Grade toluene diisocyanate | |
| | available from E. I. duPont de Nemours | |
| | & Co., Wilmington, DE 19898) | |
| | Glacial acetic acid | 0.55 g |
| | Dibutyltin diacetate | 0.45 g |
| B. | Anhydrous toluene | 110.00 g |
| C. | Anhydrous toluene | 81.00 g |
| | Silane A 1110 | 68.30 g |
| | (gamma-Aminopropyl)trimethoxy silane | |
| | availiable from Union Carbide Corp., | |
| | 270 Park Ave., New York, NY 10017) | |
| D. | Anhydrous methanol | 273.00 g |

The components of A above were mixed and heated to 155° F. (68.3° C.) under anhydrous conditions and maintained at that temperature for fifty-five minutes. At the end of that time, B was added. Over the next forty-five minutes, the temperature of the mixture was gradually reduced to 105° F. (40.6° C.) and heating was continued for two and one-quarter hours. At the end of this time, C was added to the mixture and the resulting mixture was heated at 150°-165° F. (65.6°-73.9° C.) for an additional two and one-quarter hours. During this time, samples of the reaction mixture were tested for free isocyanate functional groups. When the tests indicated no residual free isocyanate, D was added and the mixture heated under reflux for a short time. The mixture was degassed and cooled to room temperature.

EXAMPLE 2

Preparation of 1-[2-[3-(Trimethoxysilyl)propyl]-aminoethyl]piperazine Accelerator A one-liter, four-necked flask was equipped with a thermometer, a condensor, an inlet tube for nitrogen gas and an outlet tube for vent gases. Chloropropyltrimethoxysilane (198.72 g) was introduced into the flask, together with 50 g of anhydrrous 1,1,1-trichloroethane and 86.14 g of 1-(2-aminoethyl)- piperazine. The mixture was heated to 80° C. with continuous agitation for four hours and then cooled to room temperature. The reaction mixture was rapidly filtered to collect the 1-(2-aminoethyl)piperazine hydrochloride salt which had formed. The filtrate was distilled to yield 182 g of 1-[2-[3-(trimethoxysilyl)- propyl]aminoethyl]piperazine, bp 120°-143° C. at 10 mm Hg (69 kPa) as a pale yellow oil. The yield corresponded to 64% of theoretical. This material was used as an accelerator and adhesion promoter in the sealant compositions of this invention as detailed below in Example 5.

Along with the primary reaction product, smaller amounts of three other products were obtained: (a) 1-(2-aminoethyl)-4-[3-(trimethoxysilyl)propyl]piperazine; (b) bis[3-(trimethoxysilyl)propyl)piperazine; and (c) 1,4-bis[3-trimethoxypropyl)silyl]piperazine.

EXAMPLE 3

Preparation of 1-[2-[3-(Triethoxysilyl)propyl]aminoethyl]piperazine Accelerator

Starting with 241 g of chloropropyltrimethoxy-silane and 110 g of 2-aminoethylpiperazine, the procedure described in Example 2 was used to prepare 75 g of the title compound, boiling point range 145°-163° C. at 5 mm Hg (34 kPa).

EXAMPLE 4

Preparation of 1-[2-[3-(Methyldimethoxysilyl)propyl]aminoethyl]piperazine Accelerator Starting with 182.7 g of chloropropylmethyldimethoxysilane and 79 g of 2-aminoethylpiperazine, the procedure described in Example 2 was used to prepare 75 g of the title compound, boiling point range 90°-110° C. at 5 mm Hg (34 kPa).

Preparation of Sealant Compositions

EXAMPLE 5

Preparation of Sealant Composition Containing Accelerator of Example 2

A five gallon Meyers mixer with dual mixing blades was charged with 25 lb (11.34 kg) of the silane-terminated polyurethane base polymer composition of Example 1 and thoroughly mixed for five minutes under a slight vacuum with 3 lb (1.36 kg) of anhydrous methanol.

To this mixture was then added 64 g of adhesion promoter, N-beta-aminoethyl-gamma-aminopropyl trimethoxysilane, (available as Silane A1120 from Union Carbide Company, 270 Park Avenue, New York, N.Y. 10017), 77 g of a rheology control agent, Thixseal 1084 (available from NL Chemicals, Inc., Heightstown, N.J. 08520), 64 g of DBTDA anti-oxidant (available as antioxidant AO 2246 from American Cyanamide Co., Bound Brook, N.J. 08805), and 12.0 g of dibutyltin diacetate. The resulting mixture was stirred for ten minutes under slight vacuum, after which time 75 g of 1-[2-[3-trimethoxysilyl)propyl]aminoethylpiperazine were added as an accelerating agent. Carbon black (10 lb, 4.54 kg) which had been previously dried to less than 0.05% by weight moisture content, was added and the resulting mixture was mixed for one hour. The resulting mixture was stirred for ten minutes under slight vacuum, cooled to room temperature, and packaged under anhydrous conditions.

The final sealant material had the following composition (normalized to 100 parts by weight of the base polyurethane polymer):

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | 0.56 |
| 1-[2-[(3-Trimethoxysilyl)propyl]-aminoethyl]piperazine accelerator | 0.66 |
| AO 2246 Anti-oxidant | 0.56 |
| Dibutyl tin diacetate | 0.11 |

EXAMPLE 6

Preparation of Sealant Composition Containing Accelerator of Example 3

The procedure of Example 5 was followed to prepare a sealant material having the composition given below.

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | 0.56 |
| 1-[2-[(3-Triethoxysilyl)propyl]-aminoethyl]piperazine accelerator | 0.66 |
| AO 2246 Anti-oxidant | 0.56 |
| Dibutyl tin diacetate | 0.11 |

EXAMPLE 7

Preparation of Sealant Composition Containing Accelerator of Example 3

The procedure of Example 5 was followed to prepare a sealant material having the composition given below.

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | 0.56 |
| 1-[2-[3-(Methyldimethoxysilyl)-propyl]aminoethyl]piperazine accelerator | 0.66 |
| AO 2246 Anti-oxidant | 0.56 |
| Dibutyl tin diacetate | 0.11 |

EXAMPLE 8

The procedure of Example 5 was followed to prepare a sealant composition in which the amount of accelerator was decreased, and the aminosilane was omitted. The material had the following composition.

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | — |
| 1-[2-[3-(Trimethoxysilyl)propyl]-aminoethyl]piperazine accelerator | 0.46 |
| AO 2246 Anti-oxidant | 0.56 |
| Dibutyl tin diacetate | 0.11 |

EXAMPLE 9

The procedure of Example 5 was followed to prepare a sealant composition in which the amount of accelerator was increased, and the aminosilane was omitted. The material had the following composition:

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | — |
| 1-[2-[3-(Trimethoxysilyl)propyl]-aminoethyl]piperazine accelerator | 0.77 |
| AO 2246 Anti-oxidant | 0.56 |
| Dibutyl tin diacetate | 0.11 |

EXAMPLE 10

The procedure of Example 5 was followed to prepare a sealant composition in which both the accelerator and the aminosilane were omitted. The material had the following composition:

| Component | Parts by Weight |
|---|---|
| Base polyurethane polymer | 100 |
| Solvent (methanol) | 7.76 |
| Carbon black | 40.14 |
| Thixotropic agent | 0.68 |
| A 1120 Aminosilane | — |
| Accelerator | — |
| AO 2246 Anti-oxidant | 0.56 |
| Dibutyl tin diacetate | 0.11 |

We claim:
1. A one-component, moisture-curable sealant composition comprising a mixture of
(a) a silane-terminated polyurethane polymer of the formula

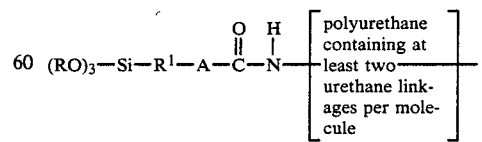

wherein

R is lower alkyl of from 1 to 6 carbon atoms;
R$^1$ is a divalent bridging radical selected from the group consisting of a divalent hydrocarbon radical, a divalent hydrocarbon ether radical, and a divalent hydrocarbon amino radical;
A is selected from the group consisting of —S— and —NR$_2$— where R$^2$ is hydrogen or alkyl of from one to six carbon atoms;
(b) from 0.2 to 1.0 parts by weight of an aminosilane per 100 parts by weight of said silane-terminated polyurethane polymer, said aminosilane having the structure

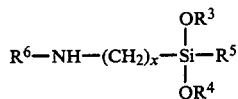

wherein
x is an integer of from one to three;
R$^3$ and R$^4$ may be the same or different and are selected from alkyl of from one to four carbon atoms;
R$^5$ is alkyl of from one to four carbon atoms or alkoxyl of from one to four carbon atoms;
R$^6$ is hydrogen or —(CH$_2$)$_y$NHR$^7$ wherein R$^7$ is hydrogen or —(CH$_2$)$_z$NH$_2$ and y and z may be the same or different and are integers of from one to three;
(c) from 0.2 to 1.0 parts by weight of an accelerator per 100 parts by weight of said silane-terminated polyurethane polymer, said accelerator selected from the group consisting of compounds or mixtures thereof having the structure

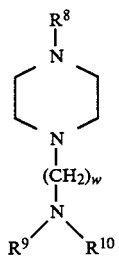

where
w is an integer of from one to five,
R$^8$, is hydrogen or

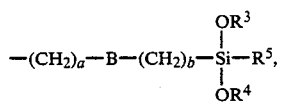

where a is an integer of from one to four, b is zero or an integer of from one to four, B is a direct bond or is a divalent hydrocarbaryl radical or a divalent cyclohydrocarbyl radical, and R$^3$, R$^4$, and R$^5$ are as previously defined,
R$^9$ and R$^{10}$ are independently
hydrogen,
alkyl of from one to five carbon atoms, or

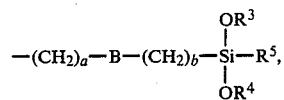

where a, b, B, R$^3$, R$^4$, and R$^5$, are as defined above, with the proviso that at least one of R$^8$, R$^9$ and R$^{10}$ must be

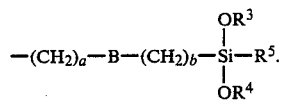

2. A one-component, moisture-curable sealant composition as defined in claim 1 wherein said silane-terminated polyurethane polymer is the reaction product of a silane having the structure

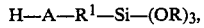

wherein A, R and R$^1$ are as defined therein, and the reaction product of a polyether polyol containing at least two hydroxyl groups per molecule and a number average molecular weight of about 1000 to about 3000 and an isocyanate having at least two isocyanate groups per molecule.

3. A one-component, moisture-curable sealant composition as defined in claim 1 wherein said silane-terminated polyurethane polymer has a number average molecular weigh of from about 10,000 to about 30,000.

4. A one-component, moisture-curable sealant composition as defined in claim 3 wherein A is —NR$^2$— where R$^2$ is as defined therein.

5. A one-component, moisture-curable sealant composition as defined in claim 1 wherein said composition comprises from 0.4 to 0.8 parts by weight of said aminosilane per 100 parts by weight of said polyurethane polymer.

6. A one-component, moisture-curable sealant composition as defined in claim 5 wherein said aminosilane is N-(beta-aminoethyl)-gamma-aminopropyl trimethoxysilane.

7. A one-component, moisture-curable sealant composition as defined in claim 1 wherein said composition comprises from 0.2 to 0.8 parts by weight of said accelerator per 100 parts by weight of said polyurethane polymer.

8. A one-component, moisture-curable sealant composition as defined in claim 1 wherein said accelerator is selected from the group consisting of
(a) 1-[2-[3-(trimethoxysilyl)propyl]aminoethyl]piperazine;
(b) 1-[2-[3-(triethoxysilyl)propyl]aminoethyl]piperazine; and
(c) 1-[2-[3-(methyldimethoxysilyl)propyl]-aminoethyl]piperazine.

9. A one-component, moisture-curable sealant composition as defined in claim 8 wherein said accelerator is 1-[2-[3-(trimethoxysilyl)propyl]aminoethyl]-piperazine.

10. A one-component, moisture-curable sealant composition as defined in claim 8 wherein said accelerator is 1-[2-[3-(triethoxysilyl)propyl]aminoethyl]piperazine.

11. A one-component, moisture-curable sealant composition as defined in claim 8 wherein said accelerator is 1-[2-[3-(methyldimethoxysilyl)propyl]aminoethyl]piperazine.

* * * * *